US008011604B1

(12) United States Patent
Holtsnider et al.

(10) Patent No.: US 8,011,604 B1
(45) Date of Patent: Sep. 6, 2011

(54) POP-UP WATER JET ASSEMBLY

(75) Inventors: Michael D. Holtsnider, Moorpark, CA (US); Francisco Hinojosa, Jr., Santa Paula, CA (US)

(73) Assignee: B & S Plastics, Inc., Oxnard, CA (US)

( * ) Notice: Subject to any disclaimer, the term of this patent is extended or adjusted under 35 U.S.C. 154(b) by 379 days.

(21) Appl. No.: 10/986,335

(22) Filed: Nov. 10, 2004

Related U.S. Application Data

(60) Provisional application No. 60/585,017, filed on Jul. 2, 2004.

(51) Int. Cl.
*A01G 25/06* (2006.01)
*B05B 15/06* (2006.01)
*B05B 15/10* (2006.01)

(52) U.S. Cl. ........ 239/200; 239/201; 239/203; 239/204; 239/205; 239/206

(58) Field of Classification Search .................. 239/200, 239/201, 203, 204, 205, 16, 17, 18, 19, 22, 239/206, 289, 600, 390–397; 362/96, 101, 362/562; 4/490, 492, 496, 507
See application file for complete search history.

(56) References Cited

U.S. PATENT DOCUMENTS

| | | | | |
|---|---|---|---|---|
| 1,651,887 | A | 12/1927 | Hawes | |
| 3,292,861 | A | 12/1966 | Kawamura et al. | |
| 3,675,252 | A * | 7/1972 | Ghiz | 4/492 |
| 4,202,499 | A * | 5/1980 | Mathews | 239/206 |
| 4,316,579 | A * | 2/1982 | Ray et al. | 239/123 |
| 4,347,979 | A * | 9/1982 | Mathews | 239/206 |
| 4,617,615 | A | 10/1986 | Eychaner | 362/216 |
| 4,840,312 | A * | 6/1989 | Tyler | 239/205 |
| 4,881,280 | A | 11/1989 | Lesikar | 4/507 |
| 5,051,875 | A | 9/1991 | Johnson | 362/101 |

(Continued)

OTHER PUBLICATIONS

Waterway, 1999 Pool, Spa, Bath Buyer's Guide, Lights p. 31.

(Continued)

*Primary Examiner* — Davis Hwu
(74) *Attorney, Agent, or Firm* — Koppel, Patrick, Heybl & Philpott

(57) ABSTRACT

A pop-up water jet assembly comprises a housing having a vertical, central axis, an upper end, a top surface, a lower end, an interior and a water inlet adjacent to the lower end communicating with the interior of the housing. A pop-up member having an upper portion, a top surface, a lower portion and an interior in communication with the interior of the housing, is movable relative to the housing between a raised position in which the upper portion of the pop-up member extends from the upper end of the housing and a lowered position in which the top surfaces of the housing and the pop-up member are substantially flush. The upper portion of the pop-up member carries a water outlet nozzle communicating with the interior of the pop-up member and having an axis at an angle to the axis of the housing to discharge water directed in a trajectory away from the pop-up jet assembly, the pop-up member being movable to its raised position in response to water flow admitted into the housing through the inlet and to its lower position under gravity bias upon termination of the water flow. The water discharged from the outlet nozzle may be illuminated by an optical fiber or LED light source mounted within the housing. Also disclosed is a water reservoir system such as a spa incorporating a pop-up water jet assembly in accordance with the invention.

17 Claims, 9 Drawing Sheets

U.S. PATENT DOCUMENTS

| | | | | | |
|---|---|---|---|---|---|
| 5,115,974 | A | | 5/1992 | Tobias et al. | 239/23 |
| 5,122,936 | A | | 6/1992 | Guthrie | 362/101 |
| 5,249,744 | A | | 10/1993 | Ruthenberg | 239/23 |
| 5,271,561 | A | | 12/1993 | Tobias et al. | 239/289 |
| 5,388,285 | A | | 2/1995 | Belniak | 4/507 |
| 5,537,696 | A | | 7/1996 | Chartier | 4/507 |
| 5,881,401 | A | | 3/1999 | Saputo | 4/490 |
| 5,893,179 | A | * | 4/1999 | Johnson | 4/507 |
| 6,138,924 | A | * | 10/2000 | Hunter et al. | 239/204 |
| 6,170,094 | B1 | | 1/2001 | Weise et al. | 4/507 |
| 6,595,435 | B1 | * | 7/2003 | Cardenas | 239/17 |
| 6,595,675 | B2 | * | 7/2003 | Dongo | 362/562 |
| 6,644,561 | B1 | * | 11/2003 | Daane | 239/18 |
| 7,182,477 | B1 | * | 2/2007 | Hartz | 362/96 |

OTHER PUBLICATIONS

Catalog Pages, PEM ‘M2’ Jumping Jets, PEM Fountain Co., Richmond Hill, On, Canada.

* cited by examiner

POP-UP WATER JET ASSEMBLY

CROSS REFERENCE TO RELATED APPLICATION

This application claims the benefit of the filing date of U.S. provisional application No. 60/585,017 filed Jul. 2, 2004, for "LED-ILLUMINATED SPA JET", and incorporated herein by reference in its entirety.

BACKGROUND OF THE INVENTION

1. Field of the Invention

The present invention relates generally to water jet assemblies, and particularly to a water jet assembly incorporating a pop-up member for discharging water into a water reservoir such as a spa.

2. Description of the Related Art

Hydrotherapy jets for use in spas, hot tubs, pools and bathtubs that discharge a stream of water are well known in the art. In accordance with one variation, disclosed in U.S. Pat. No. 6,263,522 issued on Jul. 24, 2001, to the assignee of the present invention, and incorporated herein by reference in its entirety, an adjustable hydrotherapy jet is mounted in the side wall of a spa or the like below the surface of the water. The jet includes an outlet that extends horizontally from a jet body in response to water flow admitted to the jet body and retracts, under spring bias, when the flow is terminated. The stream emanating from these hydrotherapy jets may be illuminated by means of fiber optic elements, as disclosed in U.S. Pat. No. 6,510,277, issued Jan. 21, 2003, to the assignee of the present invention and incorporated herein by reference in its entirety, or by means of an LED light source, as disclosed in the above-referenced provisional application No. 60/585,017.

U.S. Pat. No. 6,595,675, issued on Jul. 22, 2003 to the assignee of the present invention and incorporated herein by reference in its entirety, discloses a pool or spa waterfall unit incorporating fiber optic illumination. The waterfall unit is typically installed in the side wall of the pool or spa, above the surface of the water, with the majority of the waterfall unit being disposed behind the side wall with only an outlet fitting being visible from within the pool or spa.

Systems providing "jumping jets" from units positioned around or within the confines of decorative ponds or pools of the kind found in public parks are also known as exemplified by products sold by PEM Fountain Co., Ontario, Canada. These units are relatively large and are mounted above ground or above the surface of the pond water when mounted within the confines of the pond or pool. The units are mounted on stands bolted or otherwise secured to base structures located on the ground around the pool or pond or within their confines. Controllably timed, intermittent streams whose trajectories are preset may be provided and the units may include illumination sources to internally illuminate the discharged streams. These reservoirs and their associated water displays are primarily intended to be visually appreciated by observers and are generally not meant for use as a spa or swimming pool.

SUMMARY OF THE INVENTION

In accordance with one, specific exemplary embodiment of the present invention, there is provided a pop-up water jet assembly comprising a housing having a vertical central axis, an upper end, a top surface, a lower end, an interior and a water inlet adjacent to the lower end communicating with the interior of the housing. The assembly further comprises a pop-up member having an upper portion, a top surface, a lower portion and an interior in communication with the interior of the housing. The pop-up member is movable relative to the housing between a lowered position in which the top surfaces of the housing and the pop-up member are substantially flush and a raised position in which the upper portion of the pop-up member extends from the upper end of the housing. The upper portion of the pop-up member carries a water outlet nozzle communicating with the interior of the pop-up member. The nozzle has an axis at an angle to the axis of the housing to discharge water directed in an arc away from the pop-up jet assembly. The pop-up member is movable to its raised position in response to water flow admitted into the housing through the inlet and to its lowered position under gravity bias upon termination of the water flow.

In accordance with one aspect of the invention, the pop-up member has a cap overlying the upper portion of the pop-up member, the cap having a top surface that is substantially flush with a top surface of the outer housing when the pop-up member is in its lowered position, the pop-up member being thereby concealed within the housing except for the top surface. Pursuant to another aspect of the invention, the upper end of the housing carries an outwardly extending, horizontal flange having a top surface defining the top surface of the housing. Preferably, the flange comprises a thin structure.

In accordance with yet another aspect of the invention, the housing contains a light source for illuminating the water discharged from the nozzle. Preferably, the light source is mounted within a light transmitting probe. The probe may be adapted to receive a fiber optic illumination source. Alternatively, the probe may be adapted to receive an LED illumination source.

Pursuant to another, specific, exemplary embodiment of the invention, there is provided a water reservoir system comprising a reservoir shell for holding water. The shell comprises a side wall and an upper, horizontal rim extending outwardly from the side wall. At least one pop-up water jet assembly is mounted on the rim, the at least one jet assembly comprising an outer housing received within an opening in the rim and secured to the rim. The jet assembly further comprises a pop-up member carried by the outer housing, the pop-up member being raised in response to water flow into the housing to thereby expose a nozzle mounted on the pop-up member and cause water to be discharged from the nozzle onto the surface of water held by the shell. The system further includes a water source connected to the outer housing for supplying water to the housing.

According to another aspect of this embodiment, the outer housing has an upper end carrying an outwardly extending, horizontal flange having a lower surface engaging the upper surface of the rim of the reservoir shell. Preferably, the flange comprises a thin structure providing a low profile. Accordingly, other than the visible flange and the top surface of the pop-up member, the water jet assembly is located in its entirety under the top surface of the water reservoir rim when the pop-up member is in its lowermost position within the outer housing. Pursuant to another aspect of this embodiment, the outer housing and the pop-up member have top surfaces that are substantially flush when the pop-up member is in its lowered position. Still further, the outer housing may contain a light source for illuminating the water discharged from the nozzle. In this regard, means connected to the light source is provided for illuminating the light source. The light source may comprise a fiber optic illumination source. Alternatively, the light source may comprise an LED illumination source.

BRIEF DESCRIPTION OF THE DRAWINGS

The foregoing and other objects, features and advantages of the invention will become evident to those skilled in the art from the detailed description of the preferred embodiments, below, taken together with the accompanying drawings in which.

DETAILED DESCRIPTION OF THE INVENTION

The following description presents preferred embodiments of the invention representing the best mode contemplated for practicing the invention. This description is not to be taken in a limiting sense but is made merely for the purpose of describing the general principles of the invention whose scope is defined by the appended claims.

Referring to FIGS. 1-4, there is shown a pop-up water jet assembly 10 in accordance with a first exemplary embodiment of the invention. The pop-up jet assembly 10 and its components are preferably formed from a water impervious plastic such as ABS. Although various environments for the pop-up jet of the invention will be evident to those skilled in the art, the water jet assembly 10 is particularly adapted to be mounted on an upper, horizontal rim 12 (FIG. 3) extending outwardly from the side wall 14 of a spa, pool or similar water reservoir. The pop-up jet assembly 10 is designed to provide a continuous or intermittent stream of water that is directed in an arc from the assembly to an impact area on the surface of the water contained within the reservoir. It will be further evident that the pop-up jet assembly of the invention may provide a solid discharge stream, continuous or intermittent, or a spray depending upon the design of the water source supplying the assembly 10 and the discharge nozzle forming part of the assembly.

Figure 2:
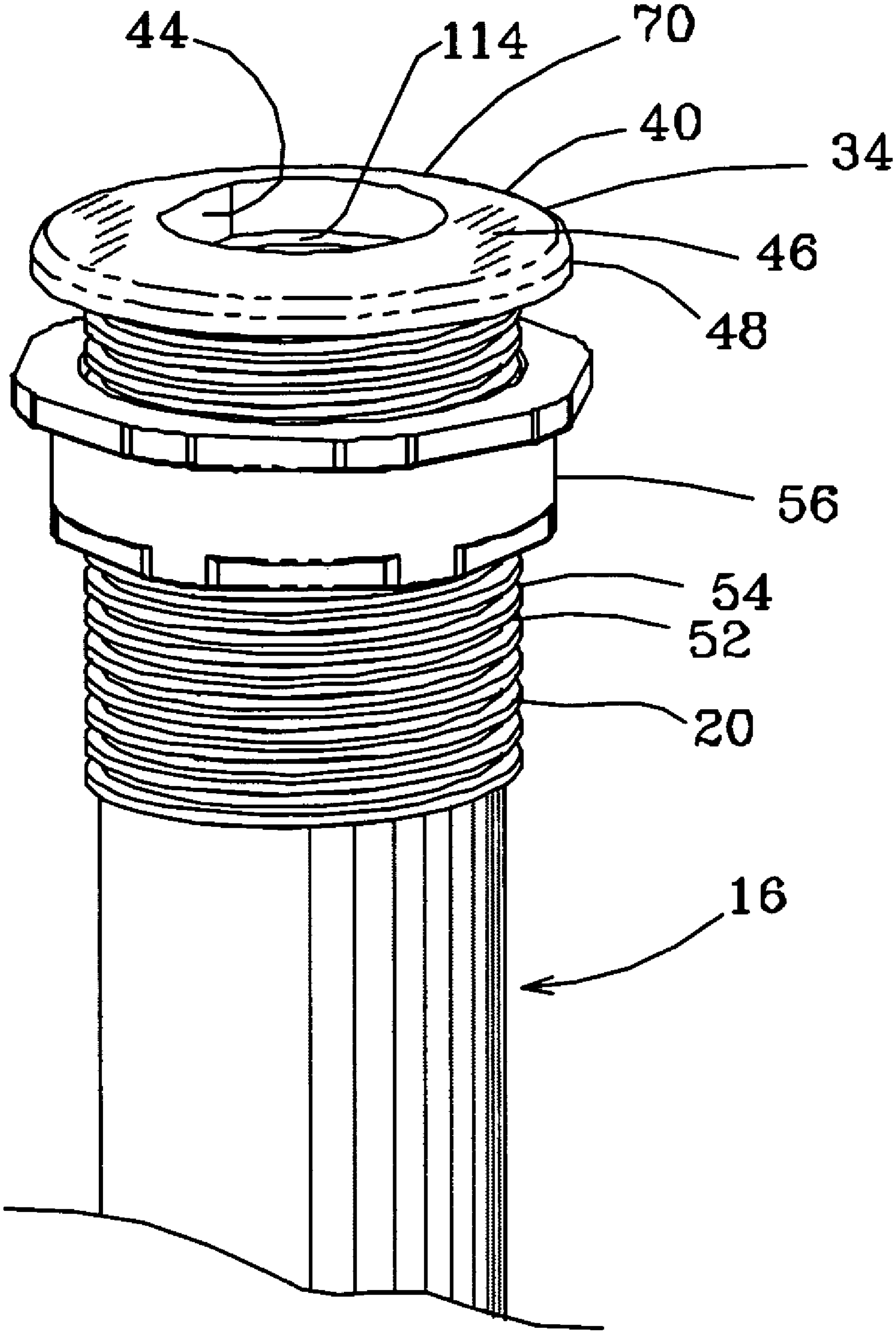
FIG. 2 is a perspective view of the upper portion of the pop-up jet assembly of FIG. 1 in which the pop-up member is in its lowermost position.
Figure 3:
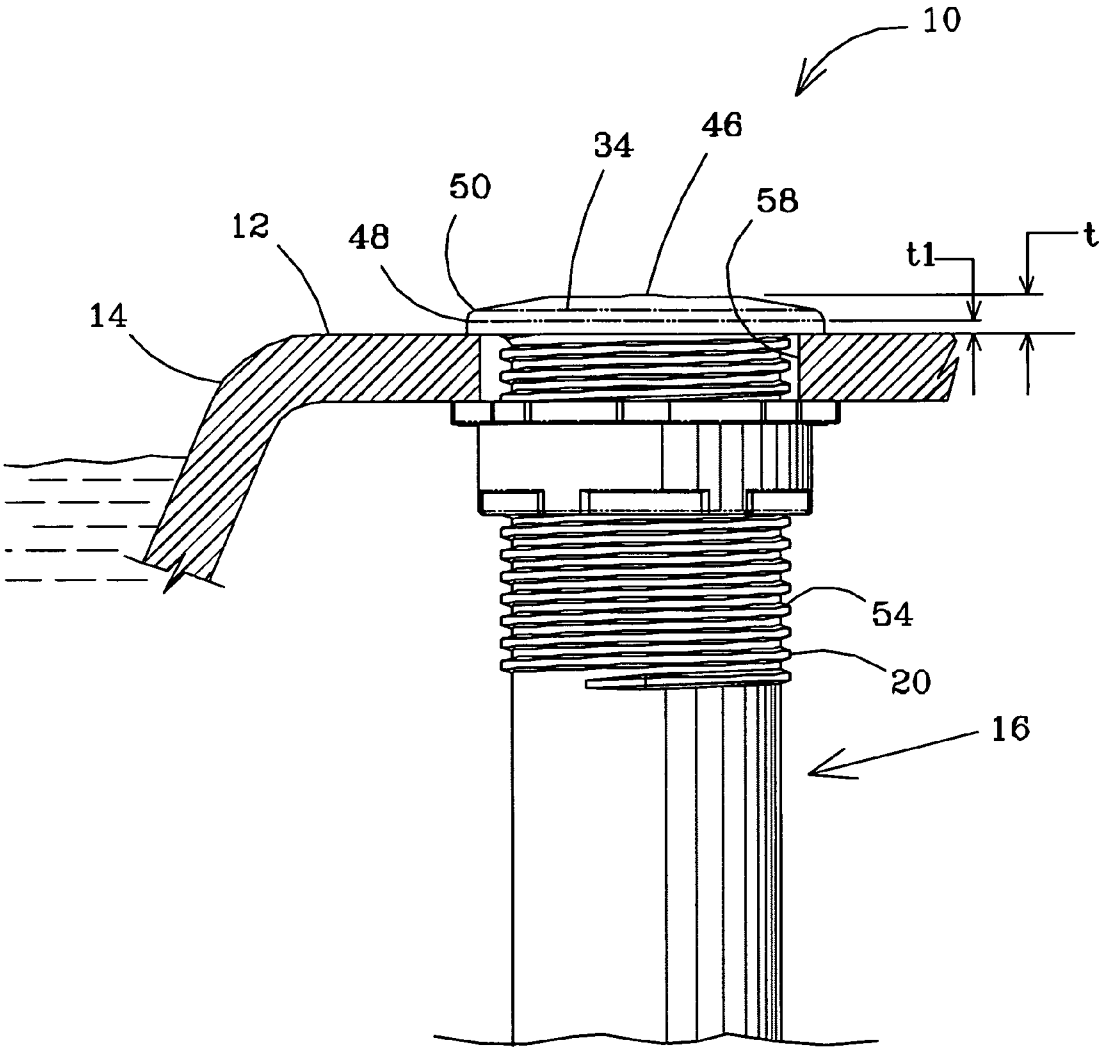
FIG. 3 is a side elevation view of the upper portion of the pop-up jet assembly of FIG. 1 with the pop-up member in its lowermost position.

The pop-up jet assembly 10 comprises an outer, preferably tubular body or housing 16 extending along a vertical, central axis 18. The housing 16 has an upper portion 20, a lower portion 22, and a top surface 24. The housing 16 further includes an inner cylindrical wall 26 defining an internal chamber 28. Attached to the lower portion 22 of the housing 16 is a water inlet pipe 30 shown in the specific example of FIGS. 1-4 as extending downwardly coaxially of the central, vertical axis 18. Alternatively, the water inlet pipe may project radially outwardly from the lower portion of the outer housing 16. The water inlet pipe 30 is preferably adapted to receive a standard water supply tube 32 attached, for example, by an appropriate clamp (not shown) to the inlet pipe 30. Formed at the upper extremity of the outer housing 16 and preferably formed integrally therewith is a horizontal, preferably thin flange 34, a portion 36 of which extends outwardly from the housing 16 and another portion 38 of which is directed inwardly. The inwardly directed portion 38 of the flange 34 has a central opening 40 defined by an edge 42 that is generally circular except for a straight or flat segment 44. The flange 34 has a top surface 46 that is preferably slightly rounded or crowned, and an outer edge 48 that blends smoothly into the flange's top surface 46. By way of example and not limitation, the flange 34 may have an outer diameter of 2 inches and a height or thickness, t, of about 3/16-inch at its thickest point (FIG. 3). The outer edge 48 may have a height, t1, of about 1/8-inch, with the corner 50 intersecting the edge 48 and the top surface 46 being rounded to provide the smooth blending mentioned above.

The upper portion 20 of the outer housing 16 has an outer surface 52 defining a threaded section 54 for receiving a threaded nut 56. The threaded section is received within an opening 58 in the horizontal rim 12 of the reservoir. The rim 12 is sandwiched between the outer portion 36 of the flange 34 and the nut 56 which, when tightened, clamps the jet assembly 10 in place. A thin sealing gasket (not shown) may be inserted between the flange 34 and the reservoir rim 12.

The water inlet pipe 30 is preferably formed as an integral part of a tubular member 60 having an upper part 62 extending into the chamber 28 of the housing 16 and is adapted to be bonded to the inner cylindrical wall 26 of the housing with an appropriate bonding agent. The tubular element includes an upper annular edge 64.

Mounted for slidable movement within the chamber 28 of the outer housing 16 is a pop-up member 70 having an upper portion 72 and a lower portion 74. The lower portion 74 is at all times contained within the chamber 28 of the outer housing 16 and includes outwardly projecting, axially spaced-apart, upper and lower lips 76 and 78, respectively, dimensioned for a free or loose fit with the inner cylindrical wall 26 of the outer housing 16 to permit the pop-up member 70 to easily slide up and down relative to the housing. The lower portion 74 of the pop-up member 70 defines an annular edge 80 at the lower extremity of the member 70. Disposed about an upper surface of the upper lip 76 is an O-ring seal 82 adapted to sealingly engage the inwardly directed portion 38 of the flange 34.

Figure 1:
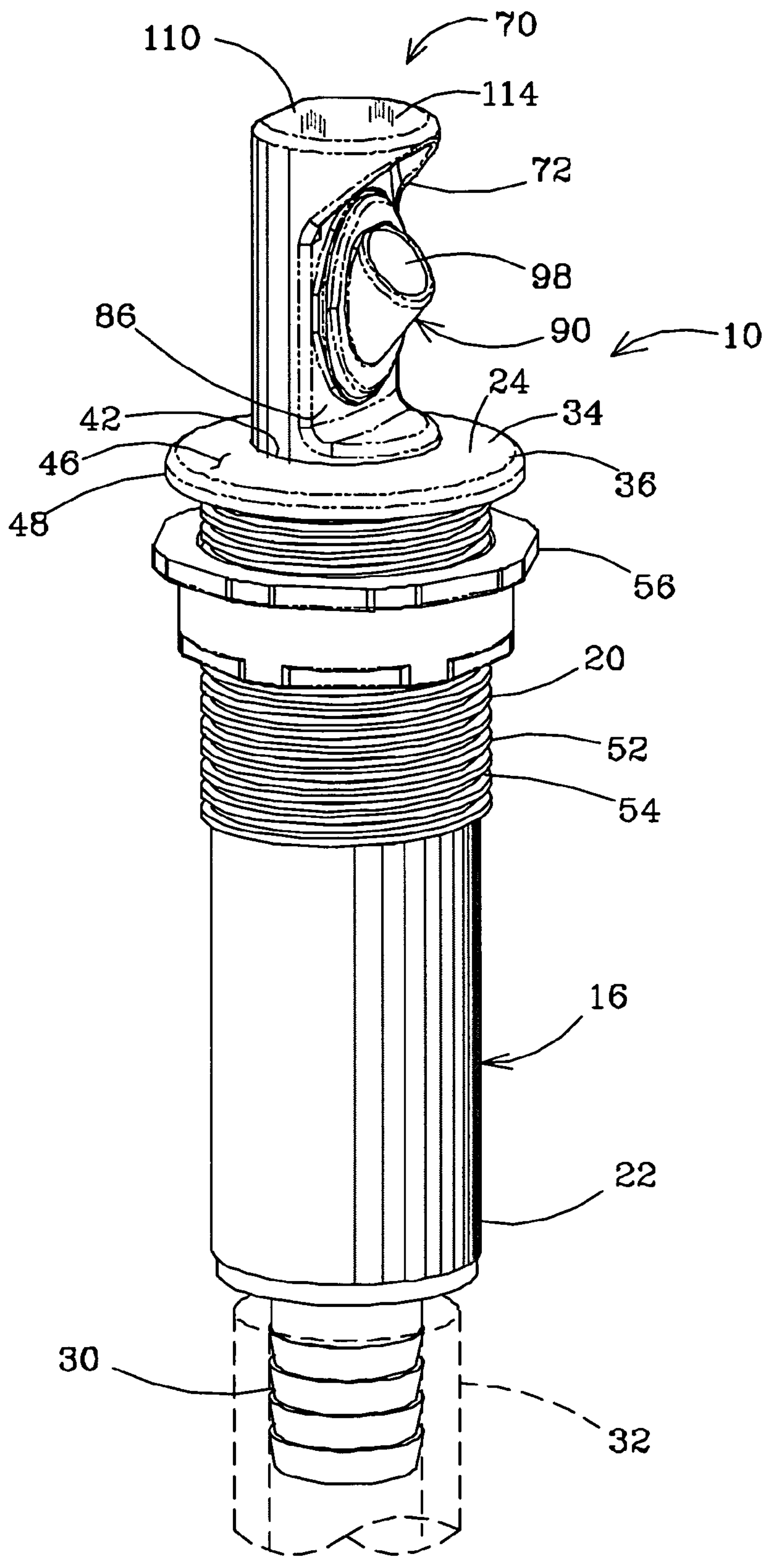
FIG. 1 is a perspective view of a pop-up jet assembly in accordance with one specific exemplary embodiment of the invention, the pop-up member of the jet assembly being shown in its elevated position.
Figure 4:
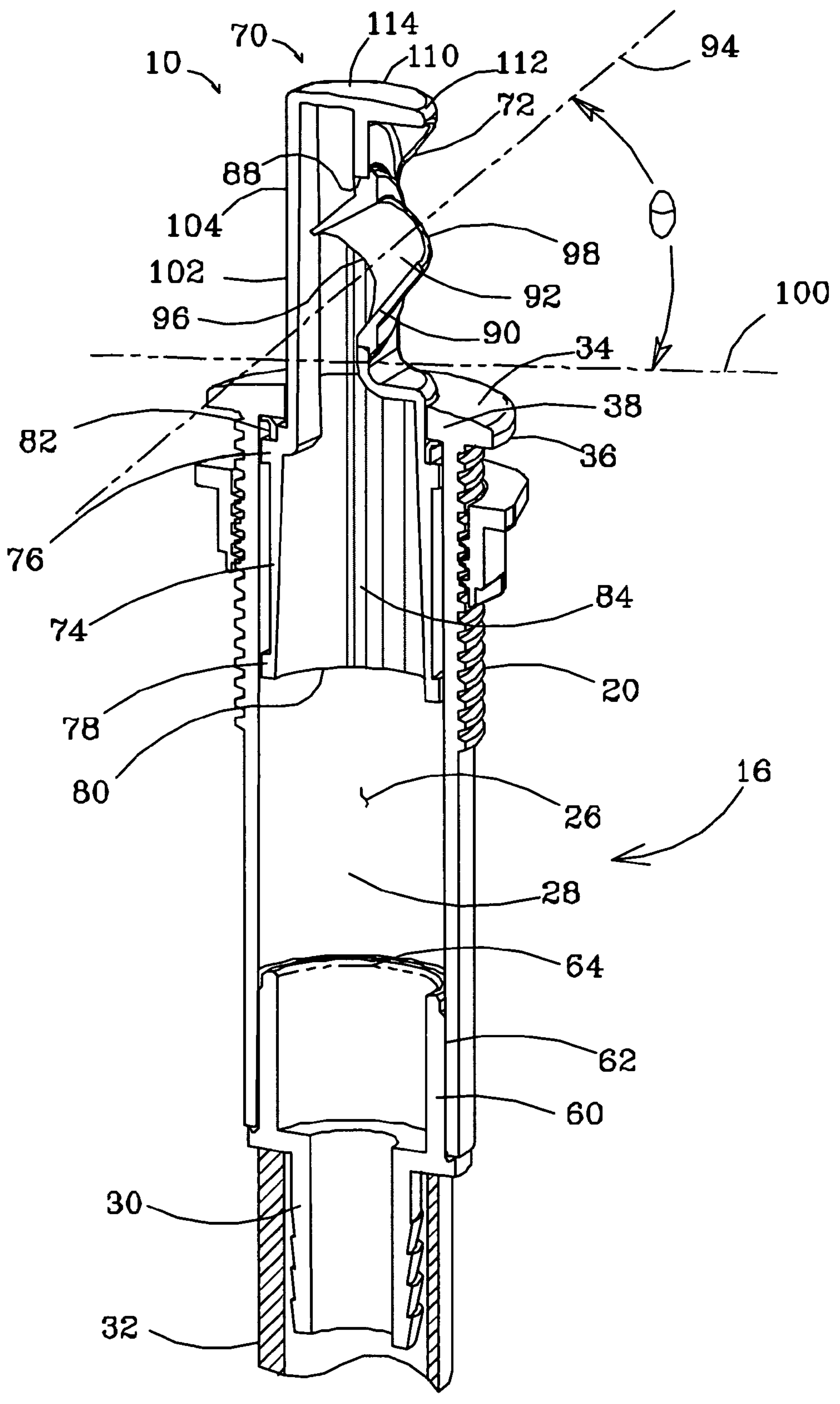
FIG. 4 is a perspective, cutaway view of the pop-up jet assembly shown in FIG. 1.

The pop-up member 70 has an interior cavity 84 closed at its upper end and open at its lower end so as to communicate with the chamber 28 of the housing 16 permitting water to flow from the water inlet pipe 30 into the cavity 84. The upper portion 72 of the pop-up member 70 has a recessed, generally vertical wall 86 defining an opening 88 for receiving a water discharge nozzle 90. The body of the nozzle 90 is preferably adhesively bonded to the part of the wall 86 around the nozzle-receiving opening 88. It will be appreciated that nozzles of various designs may be utilized and inserted in the opening 88 and bonded in place. Alternatively, the nozzle 90 may be threadedly received in the opening 88 to facilitate replacement or substitution of various nozzles to provide different water discharge characteristics, trajectories, and so forth. In the particular example under consideration, the nozzle 90 defines a nozzle passage 92 having a central axis 94, the passage 92 having a cross-section flow area that converges from a nozzle inlet 96 to a nozzle outlet 98. The axis 94 of the nozzle passage 92 may be oriented at various angles. In the specific exemplary embodiment of FIGS. 1-4, the nozzle axis 94 is directed upwardly at an angle θ of about 40° relative to a horizontal reference 100 perpendicular to the vertical central axis 18, although other angles can also be utilized. The specific nozzle passage configuration shown in FIGS. 1 and 4, provides a laminar stream flow; other stream flow properties and configurations can be built into the nozzle structure to provide different stream flows such as a spray, drops, etc.

Formed in a wall 102 of the pop-up member 70 opposite the vertical nozzle-carrying wall 86 is a vertical, flat surface 104 that cooperates with the flat segment 44 on the edge 42 of the opening 40 in the housing flange 34 so as to key the pop-up member 70 to the outer housing 16 and thereby prevent rotation of the pop-up member 70 relative to the housing while permitting axial movement thereof.

Formed at the upper extremity of the pop-up member 70 is a generally horizontal cap 110 that closes off the interior 84 of the pop-up member and has an outer edge 112 having a configuration that closely matches that of the edge 42 of the opening 40 in the flange 34. It will thus be seen, as shown in FIGS. 2 and 3, that in the lowermost position of the pop-up member 70, a top surface 114 of the cap 110 will be substantially flush with the top surface 46 of the housing flange 34 with the remainder of the pop-up member 70 being concealed within the confines of the outer housing. Preferably, the top surface 114 of the cap 110 is slightly rounded or crowned so as to define with the top surface 46 of the flange 34 a substantially continuous, smooth surface when the pop-up member 70 is in its lower position.

In the operation of the pop-up jet assembly of FIGS. 1-4, water flowing from the water inlet pipe 30 within the housing 16 under pressure forces the pop-up member 70 upwardly to its uppermost position in which the O-ring seal 82 is compressed between the upper lip 76 on the pop-up member 70 and the inwardly directed portion 38 of the housing flange 34. Accordingly, water is prevented from emerging from the opening 40 in the flange 34 around the pop-up member 70. Upon termination of water flow, the pop-up member 70 is gravity biased to its lowermost position within the housing (FIGS. 2 and 3). A stop or limit surface within the interior of the housing 16 limits the descent of the pop-up member 70 within the housing. The stop may conveniently comprise the upper edge 64 of the tubular element 60 to which the water inlet is attached; the upper edge 64 is engaged by the lower edge 80 of the pop-up member 70 to limit the downward movement of the member 70.

Figure 5:
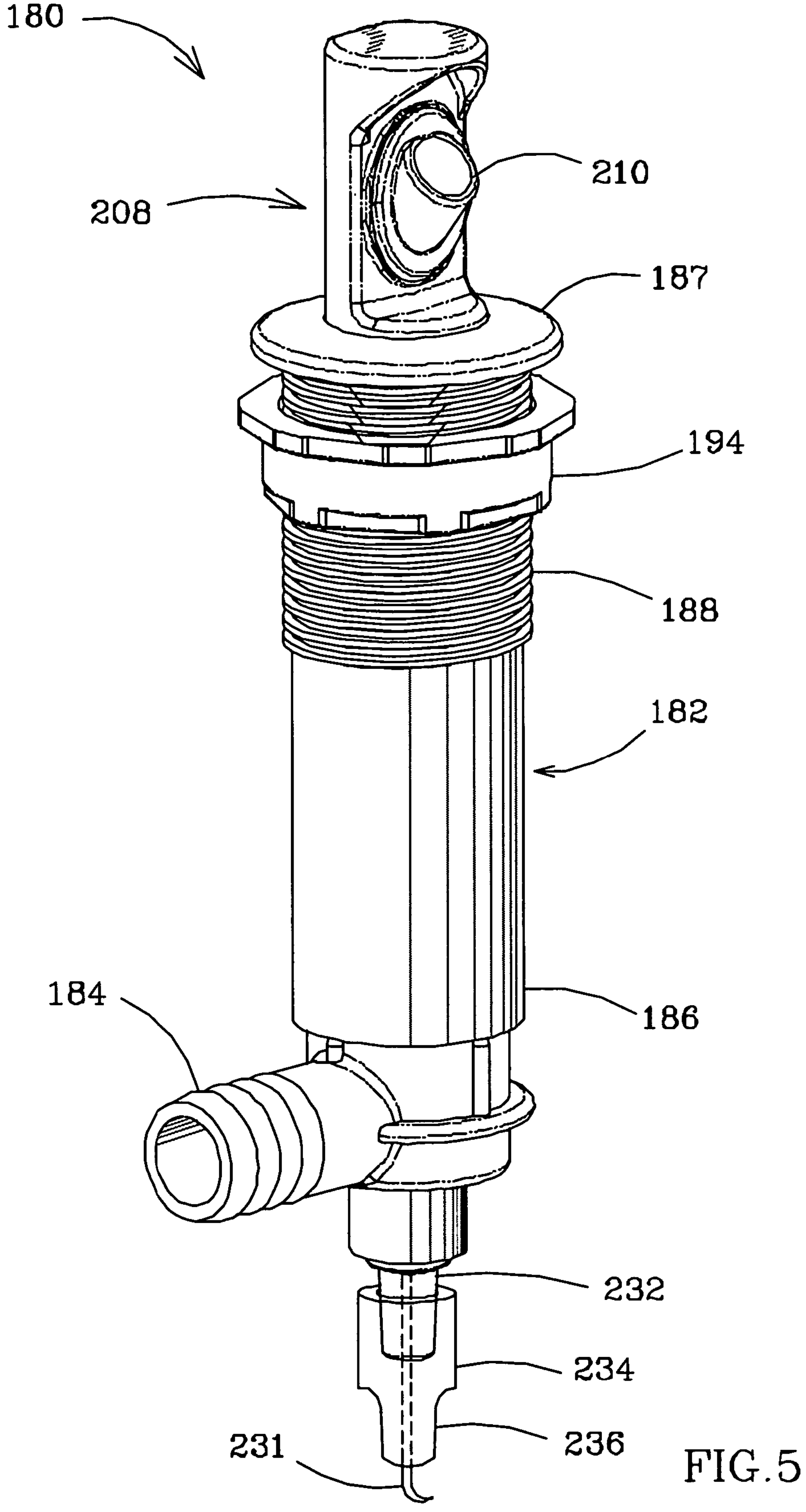
FIG. 5 is a perspective view of a pop-up jet assembly in accordance with an alternative, specific, exemplary embodiment of the invention, showing the pop-up member of the assembly in its fully raised position.
Figure 6:
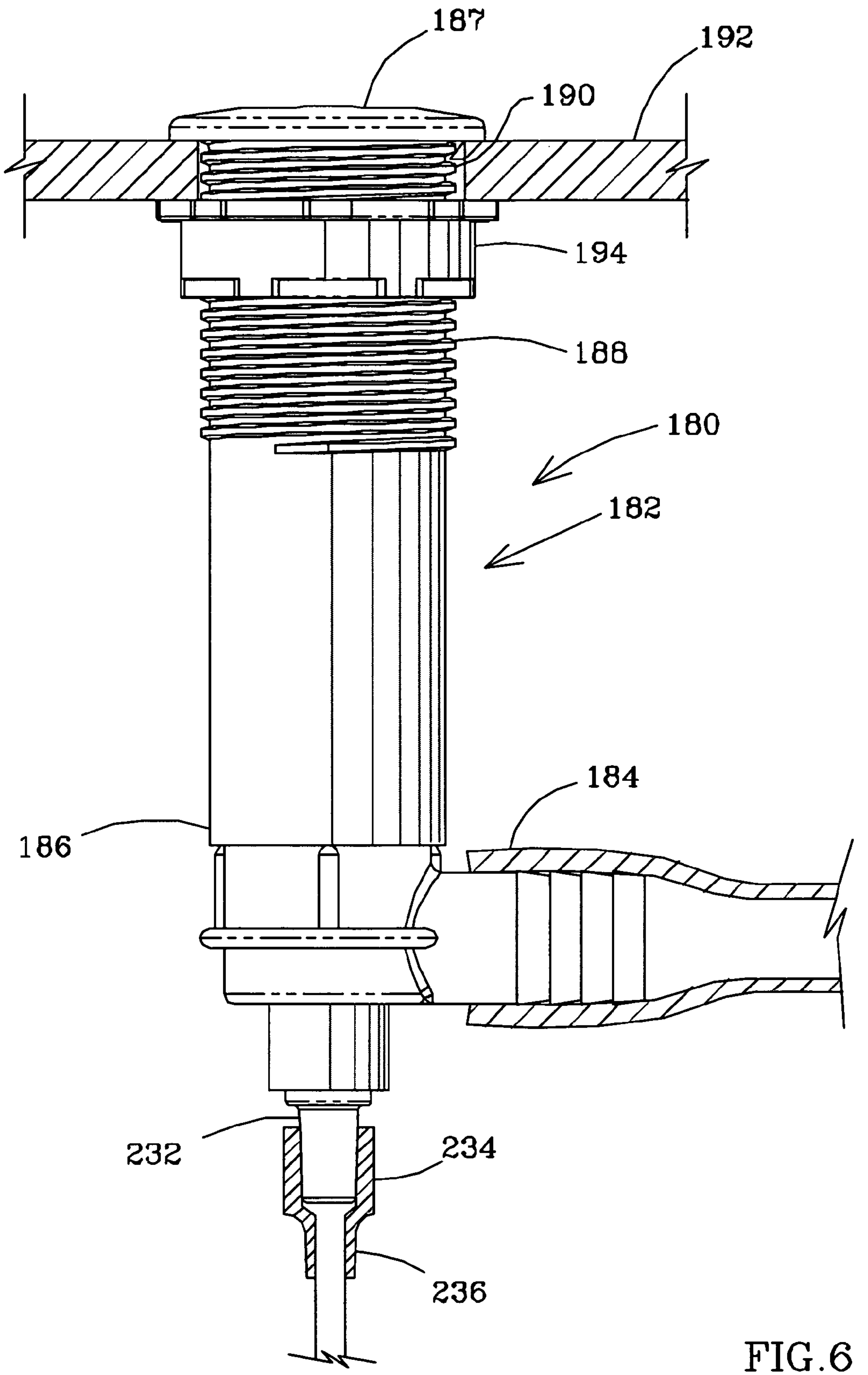
FIG. 6 is a side elevation view, partly in cross-section, of the pop-up jet assembly of FIG. 5 in which the pop-up member is in its lowermost position.
Figure 7:
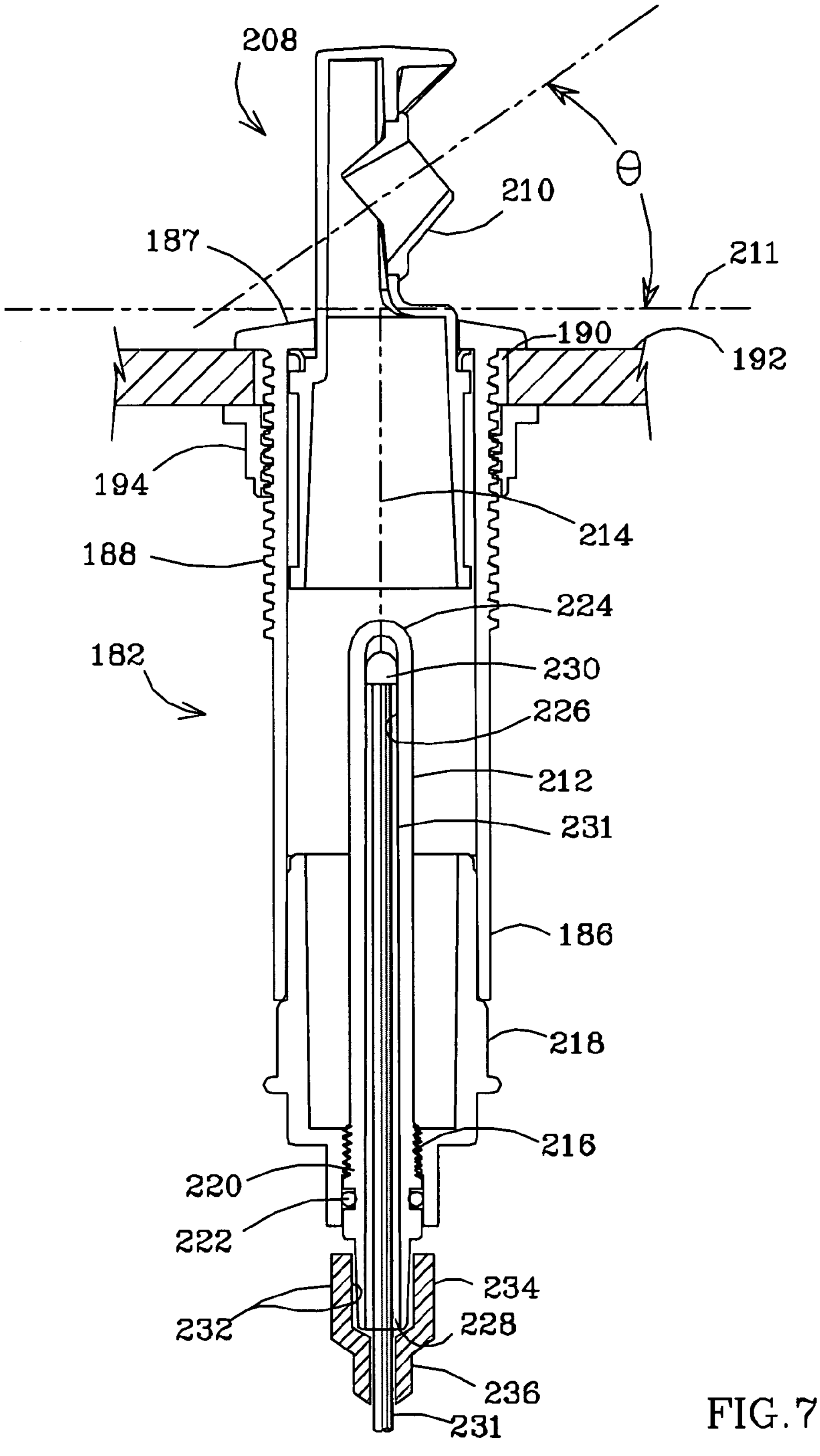
FIG. 7 is a side elevation view, in cross-section, of the pop-up jet assembly of the alternative embodiment of FIG. 5.

FIGS. 5-7 show an alternative embodiment of the present invention that is in all respects identical to that shown in FIGS. 1-4 but includes a light source for illuminating the water discharged from the pop-up jet. Accordingly, the pop-up jet assembly 180 of FIGS. 5-7 includes, as before, an outer housing 182 having a water inlet pipe 184 attached to a lower portion 186 of the housing. The housing 182 further includes a top flange 187 and a threaded section 188 adapted to be received within an opening 190 in the upper, horizontal rim 192 of a water reservoir and to cooperate with a nut 194 to secure the assembly 180 in place on the rim. A pop-up member 208 is slideably disposed within the housing 182 and has a water discharge nozzle 210 set at an appropriate angle, θ, relative to a horizontal reference 211.

The outer housing 182 contains an elongated, transparent, tubular probe 212 that extends most of the length of the housing 182 coaxial of a longitudinal central axis 214. The probe 212 is inserted into the housing 182 through a central opening 216 in the lower wall of a tubular member 218 forming an extension of the lower portion 186 of the housing 182. The probe 212 is secured along a threaded section 220 of the opening 216 to provide, along with an O-ring 222, a water tight seal. The tubular probe 212 has a closed top end 224 and defines a central, axial passageway 226 terminating at an opening 228 in the lower end of the probe. A light source 230 received by the tubular probe may comprise, by way of example and not limitation, an optical fiber 231 for transmitting light to the closed end 224 of the tubular probe 212.

The probe 212 includes a lower extension 232 that snuggly receives an elastomeric water tight sleeve 234 having a reduced diameter portion 236 that sealingly engages the optical fiber 231 (or an electrical conductor in the case in which the light source comprises an LED). In either case, the light emitted by the tip of the optical fiber 231 by the LED is directed toward the probe's closed end 224 so that the emitted light passes through the probe end to illuminate the stream of water discharged from the nozzle 210.

The probe 212 can be fabricated of many different materials that transmit, diffuse, disperse or focus light, preferably transparent or translucent polycarbonate. Alternatively, the probe 212 may be opaque along its entire length except for a transparent closed top end. Coatings, reflectors, filters and/or lenses may be incorporated in the probe for providing various optical effects. Although a tubular probe is to be preferred for its simplicity, it will be evident that the probe may have many different shapes and dimensions and may be mounted within the pop-up jet assembly in many different ways; all of these variations will be apparent to those skilled in the art. Furthermore, the light source, whether LED or optical fiber, may provide light of various colors and may be controlled for continuous light emission or for blinking or flashing operation.

Figure 8:
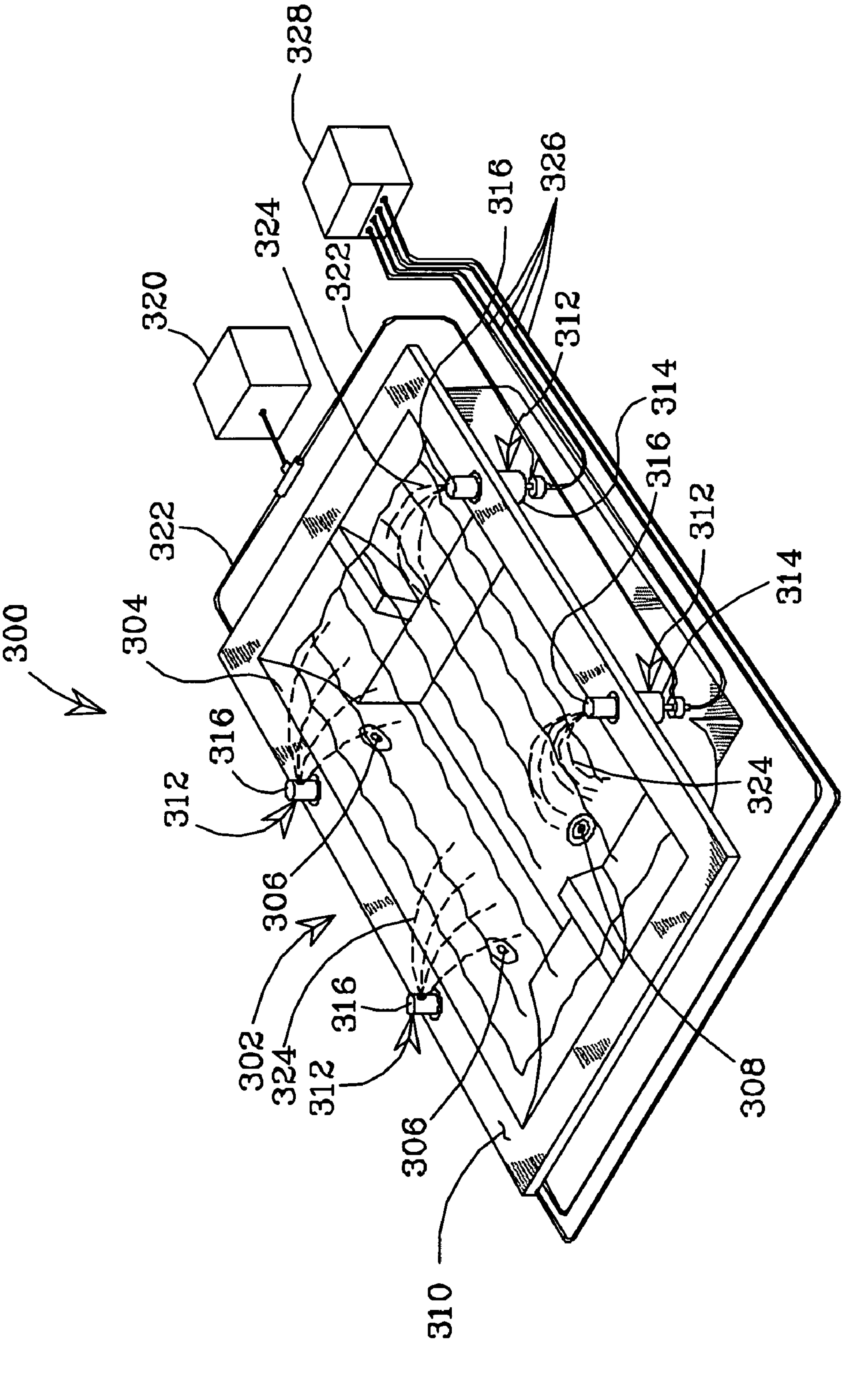
FIG. 8 is perspective view of a spa system incorporating pop-up jet assemblies in accordance with the invention.
Figure 9:
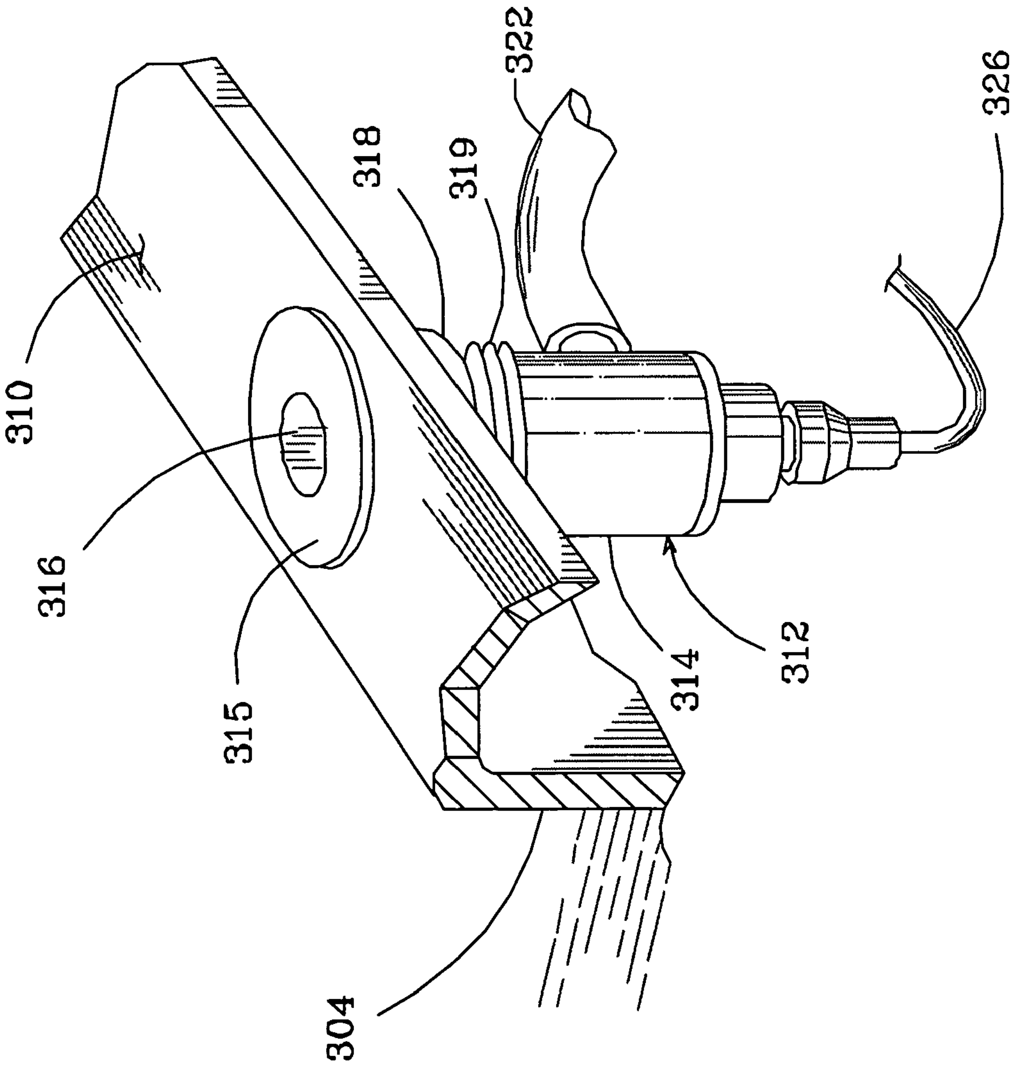
FIG. 9 is a perspective view of a portion of the system of FIG. 8.

Referring now to FIGS. 8 and 9, there is shown an example of the manner in which pop-up jet assemblies in accordance with the invention may be used in connection with a spa, pool, or like reservoir system. FIGS. 8 and 9, by way of example, show a spa 300 comprising a shell or reservoir 302 having a side wall 304 that may carry water jets 306. A drain 308 is mounted in the bottom of the reservoir. The water jets and drain are connected to an appropriate water circulation system of the kind well known in the art and which is therefore not shown. Extending outwardly from the upper edge of the reservoir side wall 304 is a horizontal rim 310 provided with holes for receiving pop-up water jet assemblies 312, each having a housing 314 with an upper flange 315 and carrying a pop-up member 316 shown extended in FIG. 8 and lowered in FIG. 9. A pop-up jet assembly 312 is inserted into each corresponding hole in the rim 310 and a nut 318 is threaded onto a threaded section 319 on the housing 314 and tightened to secure the assembly 312. To ensure a water tight seal, gaskets may be included between the rim and the flange 315. A water pump 320 is connected through appropriate water supply lines 322 to the water inlet pipes on the pop-up jet housings. The water supply system pump 320 may be programmed to provide a continuous stream or a pulsating stream, as already noted. In the example of FIGS. 8 and 9, water streams 324 discharged from the pop-up jet assemblies are illuminated by optical fibers. Individual optical fibers 326 may be appropriately connected to a light source 328 for providing appropriate colors, flashing or continuous illumination as desired. Where LEDs are used, electrical conductors will be used to connect the LEDs to an appropriate source of electrical power. All of these expedients for powering LEDs or illuminating optical fibers are well known in the art.

Although FIGS. 8 and 9 are directed specifically to the pop-up jet assembly embodiment of FIGS. 5-7, it will be evident that it is equally applicable to the embodiment of FIGS. 1-4, except that the illumination source would be omitted.

When the pop-up member is in its lower position, the entire assembly is concealed below the top surface of the rim of the reservoir except for the thin flange on the top of the outer housing and the top surface of the pop-up member cap within the opening in the flange. The top surfaces of the housing flange and the pop-up member cap together form a substantially smooth, slightly rounded or crowned, continuous surface. The outer top edge of the housing flange is rounded. The result is that with the pop-up member in its lowest position, the only portion of the assembly that is visible above the top surface of the spa rim comprises a low profile, unobtrusive structure that does not significantly interfere with persons seated or standing on the rim.

We claim:

1. A pop-up water jet assembly comprising:

a substantially cylindrical housing having a vertical, central axis, an upper end, a top surface, a lower end, an exterior, an interior and a water inlet adjacent to said lower and communicating with the interior of the housing, said housing futher comprising threading on at least a portion of its exterior for rotatably securing said housing to the wall of a water reservoir; and a pop-up member having an upper portion, a top surface, a lower portion and an interior in communication with the interior of the housing, the pop-up member being movable relative to the housing between a raised position in which the upper portion of the pop-up member extends from the upper end of the housing and a lowered position in which the top surfaces of the housing and the pop-up member are substantially flush, the upper portion of the pop-up member disposed to prevent rotation relative to the housing interior, the upper portion of the pop-up member carrying a water outlet nozzle communicating with the interior of the pop-up member and having an axis at an angle to the axis of the housing to discharge water directed in a trajectory away from the pop-up jet assembly, the pop-up member being movable to its raised position in response to water flow admitted into the housing through the inlet and to its lower position under gravity bias upon termination of the water flow, wherein the upper end of the housing carries an outwardly extending, horizontal flange having a top surface defining the top surface of the housing, and wherein the flange has in inwardly extending portion defining an opening through which the pop-up member is adapted to extend, and wherein the pop-up member is keyed to the housing to prevent rotation thereof relative to the housing while permitting axial movement of said member relative to the housing, and wherein the pop-up member is keyed to the housing by a flat formed on an edge defining an opening in the inwardly directed flange and a corresponding flat being defined on a surface of the pop-up member.

2. The jet of claim 1 in which:

the outlet nozzle comprises a passage connecting a nozzle inlet and a nozzle outlet, the passage having a flow cross-section area that converges between the nozzle inlet and the nozzle outlet.

3. The jet of claim 1 in which:

the upper portion of the pop-up member has a surface keyed to the housing to prevent rotation of the pop-up member relative to the housing.

4. The jet of claim 1 in which:

the lower portion of the housing contains a stop engageable by the pop-up member in the lower position of the member.

5. The jet of claim 4 in which:

the water inlet adjacent to the lower end of the housing is defined by a tubular element received within the lower end of the housing, the tubular element having an upper edge defining said stop, said upper edge of the tubular element being engageable by a lower edge on the pop-up member in its lower position.

6. The jet of claim 1 in which:

the upper portion of the pop-up member comprises a recessed wall carrying the water outlet nozzle.

7. The jet of claim 6 in which:

the recessed wall has an opening within which the water outlet nozzle is mounted.

8. The jet of claim 1 in which:

the pop-up member has a cap overlying the upper portion of the pop-up member, the cap having a top surface that is substantially flush with a top surface of an outer housing when the pop-up member is in its lower position, the pop-up member being thereby concealed within the housing except for said top surface.

9. The jet of claim 1 in which:

the nozzle axis angle is directed upwardly at an angle of about 40° relative to a horizontal reference.

10. The jet of claim 1 in which:

the flange comprises a thin structure.

11. The jet of claim 1 in which:

the top surface of the flange is crowned.

12. The jet of claim 1 in which:

the flange has an outer edge surface blended into the top surface of the flange.

13. The jet of claim 12 in which:

the housing contains a light source for illuminating the water discharged from the nozzle.

14. The jet of claim 13 in which:

the light source is mounted within a light transmitting probe.

15. The jet of claim 14 in which:

the probe is oriented vertically.

16. The jet of claim 15 in which:

the probe is adapted to receive a fiber option illumination source.

17. The jet of claim 16 in which:

the probe is adapted to receive an LED illumination source.

* * * * *

UNITED STATES PATENT AND TRADEMARK OFFICE

CERTIFICATE OF CORRECTION

PATENT NO. : 8,011,604 B1
APPLICATION NO. : 10/986335
DATED : September 6, 2011
INVENTOR(S) : Michael D. Holtsnider and Francisco Hinojosa, Jr.

It is certified that error appears in the above-identified patent and that said Letters Patent is hereby corrected as shown below:

Col. 7, Claim 1, Line 5, after "lower" and before "and" please add the word --end--

Signed and Sealed this
Eighteenth Day of October, 2011

David J. Kappos

David J. Kappos
*Director of the United States Patent and Trademark Office*

UNITED STATES PATENT AND TRADEMARK OFFICE

CERTIFICATE OF CORRECTION

PATENT NO. : 8,011,604 B1
APPLICATION NO. : 10/986335
DATED : September 6, 2011
INVENTOR(S) : Michael D. Holtsnider and Francisco Hinojosa, Jr.

It is certified that error appears in the above-identified patent and that said Letters Patent is hereby corrected as shown below:

Column 7, line 23 (Claim 1, Line 5) after "lower" and before "and" please add the word --end--

This certificate supersedes the Certificate of Correction issued October 18, 2011.

Signed and Sealed this
Twenty-second Day of November, 2011

David J. Kappos

David J. Kappos
*Director of the United States Patent and Trademark Office*